United States Patent [19]

Iwasaki et al.

[11] 4,349,454
[45] Sep. 14, 1982

[54] PREPARATION OF AQUEOUS MEDIUM SUITABLE FOR PREPARING MICROCAPSULES

[75] Inventors: Hiroshi Iwasaki; Shinsuke Irii; Mitsuru Kondo, all of Amagasaki, Japan

[73] Assignee: Kanzaki Paper Manufacturing Company Limited, Japan

[21] Appl. No.: 115,915

[22] Filed: Jan. 28, 1980

[30] Foreign Application Priority Data

Feb. 14, 1979 [JP] Japan .................................. 54/16535
Mar. 12, 1979 [JP] Japan .................................. 54/29654
Oct. 17, 1979 [JP] Japan .................................. 54/134369

[51] Int. Cl.$^3$ .......................... B01J 13/00; B01J 13/02
[52] U.S. Cl. .................................... 252/312; 252/316; 282/27.5; 428/914
[58] Field of Search ................ 252/316, 312; 282/27.5

[56] References Cited

U.S. PATENT DOCUMENTS 4,000,087 12/1976 Maalouf ............................. 252/316
4,001,140 1/1977 Foris et al. ......................... 252/316
4,054,718 10/1977 Garner et al. ................. 282/27.5 X

FOREIGN PATENT DOCUMENTS 48-95420 12/1973 Japan ................................. 252/316

OTHER PUBLICATIONS

Beilsteins Handbuch, vol. 13, p. 704, (1930).

Primary Examiner—Richard D. Lovering
Attorney, Agent, or Firm—Armstrong, Nikaido, Marmelstein & Kubovcik

[57] ABSTRACT

A hydrophobic organic solvent containing a compound of the formula

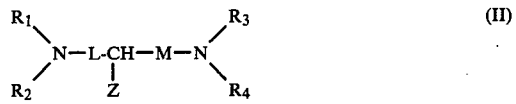

is dispersed and emulsified in an aqueous medium containing a sulfinic acid of the formula

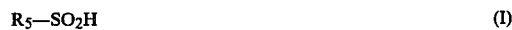

and serving as an aqueous medium for preparing microcapsules to react the compounds of the formulae (I) and (II) and synthesize a diarylmethane derivative of the formula

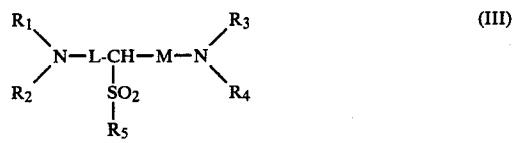

while encapsulating oily droplets of the resulting hydrophobic organic solvent solution of the diarylmethane derivative. Colorless chromogenic materials can be synthesized and encapsulated at the same time by this process.

28 Claims, No Drawings

PREPARATION OF AQUEOUS MEDIUM SUITABLE FOR PREPARING MICROCAPSULES

TECHNICAL FIELD

This invention relates to a process for preparing microcapsules, and more particularly to a process for preparing excellent microcapsules enclosing specific diarylmethane derivatives as colorless chromogenic materials.

BACKGROUND ART

In recent years various recording methods have been proposed which utilize the color forming reaction between an electron donating basic colorless chromogenic material and an electron accepting acidic reactant material. Especially microcapsules enclosing droplets of hydrophobic oily solutions of colorless chromogenic materials were widely used for pressure sensitive manifold paper, etc.

The chromogenic material to be encapsulated must be capable of exhibiting good color forming properties when recording and giving color records with high stability. Additionally the chromogenic material must remain stable when formulated into a hydrophobic oily solution and then dispersed and emulsified in an aqueous medium for encapsulation and must be amenable to efficient encapsulation.

Diarylmethane derivatives represented by the formula

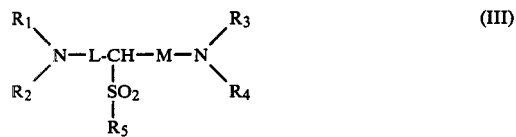

wherein L and M are each 1,4-arylene with or without a substituent, $R_1$, $R_2$, $R_3$ and $R_4$ are each alkyl, cycloalkyl, aralkyl or aryl with or without a substituent, and $R_5$ is alkyl, cycloalkyl, aralkyl, aryl or heteroaryl with or without a substituent are synthesized by a reaction in an aqueous medium, for example, by the reaction of a corresponding diphenylcarbinol with a sulfinic acid in an acidic aqueous solution (Beilstein Organische Chemie, Vol. 13, p. 704), or by the reaction of auramine with a sulfinic acid in an acidic aqueous solution (Japanese Kokai No. 95420/1973). With these processes which use an aqueous medium, the reactants to be reacted with sulfinic acids are limited to diphenylcarbinols or auramine, so that the processes involve the problem that the starting materials are available only from limited sources. Additionally preparation of hydrophobic organic solvent solutions of such diarylmethane derivatives requires the step of isolating the synthesized diarylmethane derivative from the aqueous medium and the subsequent step of purification. These isolating and purifying steps inevitably entail a reduction in the yield of the synthesized derivative and permit degradation of part of the derivative during the procedure. The diarylmethane derivatives of the formula (III) have another drawback that when a hydrophobic organic solvent solution of the derivative is dispersed in an aqueous medium for encapsulation, the derivative markedly dissolves out into the aqueous medium, with the result that the quantity of the derivative to be encapsulated as the chromogenic material substantially reduces.

An object of the invention is to eliminate the foregoing drawbacks involved in the synthesis and encapsulation of the diarylmethane derivatives of the formula (III) and to provide a process for synthesizing and encapsulating the derivatives with a greatly improved efficiency.

Another object of the invention is to provide a process for preparing microcapsules by which colorless chromogenic materials can be synthesized and encapsulated at the same time by a single step very efficiently.

These and other objects of the present invention will become apparent from the following description.

DISCLOSURE OF INVENTION

The present invention provides a process for preparing microcapsules characterized in that a hydrophobic organic solvent containing a compound represented by the formula

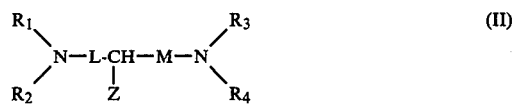

is dispersed and emulsified in an aqueous medium containing a sulfinic acid of the formula

and serving as an aqueous medium for preparing the microcapsules to react the compounds of the formulae (I) and (II) and synthesize a diarylmethane derivative represented by the formula

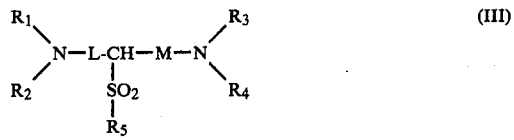

while encapsulating oily droplets of the resulting hydrophobic organic solvent solution of the diarylmethane derivative.

In the above formulae L and M are each a 1,4-arylene group with or without a substituent, $R_1$, $R_2$, $R_3$ and $R_4$ are each alkyl, cycloalkyl, aralkyl or aryl with or without a substituent, Z is a group represented by —O—A,

or —S—D in which A, B, C and D are each hydrogen or a hydrocarbon group with or without at least one hetero atom, and $R_5$ is alkyl, cycloalkyl, aryl, aralkyl or heteroaryl with or without a substituent.

The hydrophobic organic solvents to be used in this invention must be capable of dissolving the diarylmethane derivatives of the formula (III). Preferably such solvents are those capable of dissolving the compounds of the formula (I) or the compounds of the formula (II), more preferably both the compounds. Suitable organic solvents, which are selected in accordance with the kind of the diarylmethane derivative to be obtained, etc., include, for example, aromatic mono- or polycyclic hydrocarbon compounds, such as benzene, toluene, xylene, chlorobenzene, anisole, nitrobenzene, alkyl-substituted naphthalene, diphenylalkane, alkyl-substituted diphenylalkane, alkyl-substituted biphenyl, hydrogenated biphenyl, hydrogenated terphenyl, etc.; aromatic esters, such as phthalates, salicylates, benzoates, etc.; and like aromatic organic solvents. Especially preferable are aromatic esters, such as dimethyl phthalate, dibutyl phthalate and like phthalates, and methyl salicylate, ethyl salicylate, hexyl salicylate and like salicyaltes because such solvents assure high yields with inhibited side reaction.

One of the two starting compounds to be used in this invention is a compound represented by the formula

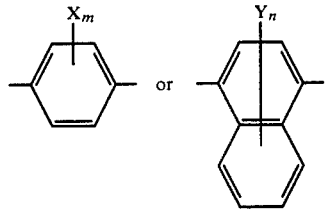  (II)

L and M in the formula (II) are each a 1,4-arylene group with or without a substituent, such as a 1,4-phenylene group or 1,4-naphthylene group represented by the formula

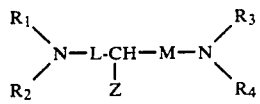

wherein X and Y are each halogen, alkyl, alkoxy, cyano, substituted amino or nitro, and m and n are each 0 or an integer of 1 or 2. More specific examples of the groups X and Y are the same as those given below for $R_1$ and $R_4$.

$R_1$, $R_2$, $R_3$ and $R_4$ in the formula (II) are each alkyl, cycloalkyl, aralkyl or aryl with or without a substituent. The alkyl groups include those having 1 to 18 carbon atoms, such as methyl, ethyl, butyl, hexyl, decyl, stearyl, etc. The cycloalkyl groups include those having 5 to 8 carbon atoms, such as cyclopentyl, cyclohexyl, cyclooctyl, etc. The aralkyl groups include those having 7 to 10 carbon atoms, such as benzyl, phenethyl, phenylpropyl, etc. The aryl groups include those having 6 to 14 carbon atoms, such as phenyl, naphthyl, anthryl, anthraquinonyl, etc.

Examples of the substituents in the substituted alkyl and substituted cycloalkyl are halogen, alkoxy, cyano and substituted amino. Examples of the substituents in the substituted aralkyl and substituted aryl are halogen, alkyl, alkoxy, aralkyl, aryl, cyano, substituted amino and nitro. Examples of the halogen substituents are fluorine, chlorine, bromine and iodine. Examples of the alkyl, aralkyl and aryl substituents are those exemplified above. Exemplary of the alkoxy substituents are alkoxy groups having 1 to 4 carbon atoms. Examples of the substituted amino substituents are those represented by

in which $R_6$ and $R_7$ have the same meaning as $R_1$ to $R_4$. $R_1$ and $R_2$, $R_1$ and L, $R_2$ and L, $R_3$ and $R_4$, $R_3$ and M, $R_4$ and M, or $R_6$ and $R_7$ can be linked to each other to form a heterocyclic ring. Especially preferable of such heterocyclic rings are saturated 5-membered and 6-membered rings.

Z in the formula (II) is a substituent represented by —O—A,

or —S—D in which A, B, C and D are each hydrogen or a hydrocarbon group with or without at least one hetero atom. Examples of the hydrocarbon groups are the same as those given above for $R_1$ to $R_4$ and include alkyl, cycloalkyl, aralkyl and aryl with or without a substituent. The compounds of the formula (II) in which Z is —OH assure a higher reaction velocity and better yield and are therefore most preferable to use.

Specific examples of compounds represented by the formula (II) are 4,4'-bis-dimethylamino-benzhydrol, 4,4'-bis-diethylamino-benzhydrol, 4,4'-bis-dibutylamino-benzhydrol, 4,4'-bis-didodecylamino-benzhydrol, 4,4'-bis-dibenzylamino-benzhydrol, 4,4'-bis-(N-ethyl-N-benzyl)amino-benzhydrol, 4,4'-bis-dimethylamino-3-methyl-benzhydrol, 4,4'-bis-dimethylamino-2,2'-dichloro-benzhydrol, 4,4'-bis-dimethylamino-3,3'-dimethyl-benzhydrol, 4,4'-bis-dimethylamino-2,2'-dimethoxy-benzhydrol, 4,4'-bis-dimethylamino-2-acetamino-benzhydrol, 4,4'-bis-dimethylamino-3-benzamino-benzhydrol, 4,4'-bis-dimethylamino-3-nitro-benzhydrol, 2,4,4'-tris-dimethylamino-3-methyl-benzhydrol, 4,4'-bis-di(cyanoethyl)amino-benzhydrol, 4,4'-bis-(N-methyl-N-o-chlorobenzyl)amino-benzhydrol, 4,4'-bis-di(p-methylbenzyl)amino-benzhydrol, 4,4'-bis-(N-ethyl-N-m-nitrobenzyl)amino-benzhydrol, 4,4'-bis-(N-ethyl-N-p-dimethylaminobenzyl)amino-benzhydrol, 4,4'-bis-dimethylamino-benzhydrol-methyl ether, 4,4'-bis-dimethylamino-benzhydrol-ethyl ether, 4,4'-bis-dimethylamino-benzhydrol-isopropyl ether, 4,4'-bis-dimethylamino-benzhydrol-n-octyl ether, 4,4'-bis-dimethylamino-benzhydrol-benzyl ether, 4,4'-bis-dimethylamino-benzhydrol-phenetyl ether, 4,4'-bis-dimethylamino-benzhydrol-p-methoxybenzyl ether, 4,4'-bis-dimethylamino-benzhydrol-phenyl ether, 4,4'-bis-dimethylamino-benzhydrol-tolyl ether, 4,4'-bis-dimethylamino-benzhydrol-naphthyl ether, 4,4'-bis-dimethylamino-benzhydrol-biphenyl ether, 4,4'-bis-dimethylamino-benzhydrol-cyclohexyl ether, 4,4'-bis-dimethylamino-benzhydrol-pyridyl ether, 4,4'-bis-dimethylamino-benzhydrol-quinolyl ether, 4,4'-bis-dimethylamino-benzhydrol-acetophenoneoxime ether, 4,4'-bis-dimethylamino-benzhydrol-4-chloroacetophenoneoxime ether, bis-(4,4'-bis-dimethylamino-benzhydryl) ether, bis-(4,4'-bis-diethylamino-benzhydryl) ether, bis-(4-piperidinophenyl)carbinol methyl ether, bis-(N-methyl-6-tetrahydroquinolyl)carbinol methyl ether, bis-(2-methylcarboxy-4-dimethylaminophenyl)-carbinol ethyl ether, 4,4'-bis(N-methyl-N-4-methylcyclohexyl)aminobenzhydrol methyl ether, 4,4'-bis-(N-methyl-N-chloroethyl)amino-benzhydrol benzyl ether, bis-(4,4'-dimethylamino-benzhydryl)-sulfide, bis-(4,4'-dimethylamino-benzhydryl)-disulfide, 4,4'-dimethylamino-benzhydrylamine, 4,4'-diethylamino-benzhydrylamine, N-phenyl-leucoauramine, N-(2-nitrophenyl)-leucoauramine, N-p-toluyl-leucoauramine, N-(2,4-dimethyl-phenyl)-leucoauramine, N-α-naphthyl-leucoauramine, carbonyldileucoauramine, p-phenylenedileucoauramine, N-(3-dimethylamino-4-methylphenyl)-leucoauramine, [diphenylene-(4,4')]-dileucoauramine, bis-(4,4'-bis-dimethylamino-benzhydryl)amine, [3,3'-dimethyl-diphenylene-(4,4')]dileucoauramine, morpholino-leucoauramine, piperidinoleucoauramine, (N-butyl-N-2,5-dichlorophenyl)leucoauramine, N-bis-(p-dimethylaminophenyl)-methyloctadecylamine, N-bis-(p-dimethylaminophenyl)-methyl-N'-methyl-piperazine, 3,3'-dichloro-4,4'-[N,N'-bis-(tetramethyl-p,p'-diaminodiphenylmethyl)]-diaminodiphenylmethane, N-[bis-(p-dimethylaminophenyl)-methyl]bicyclo(2,2,1)-5-heptene-2,3-dicarboxyimide, N,N'-bis[bis-(4,4'-dimethylaminophenyl)-methyl[-1,6-hexamethylenediamine, [bis-(4,4'-dimethylaminophenyl)-methyl]β-octylamine, N-bis-(4-dimethylaminophenyl)-methylglycine ethyl ester, N-bis-(p-dimethylaminophenyl)methyl-2-chloro-5-trifluoromethylaniline, N-[bis-(p-dimethylaminophenyl)-methyl]-2-amino-6-ethoxybenzothiazole, bis-[bis-(p-dimethylaminophenyl)-methyl]-benzotriazole, N,N'-bis-[bis-(p-dimethylaminophenyl)methyl]-1,5-naphthylenediamine, etc.

Among these compounds which may be used as suitably selected, preferable are those of the formula (II) in which the substituents L and M are each 1,4-phenylene having no substituent, and $R_1$, $R_2$, $R_3$ and $R_4$ are each $C_1$–$C_4$ alkyl, benzyl, or benzyl substituted with halogen, methyl, halogenated methyl or nitro. Especially the compounds in which the substituents L and M are each 1,4-phenylene without any substituent, and $R_1$, $R_2$, $R_3$ and $R_4$ are each $C_1$–$C_4$ alkyl are desirable for use in pressure sensitive manifold paper, since the resulting solutions exhibit good color forming properties and give color records with high stability.

According to the present invention, the other co-reactant is a sulfinic acid represented by the formula

$$R_5-SO_2H \qquad (I)$$

wherein $R_5$ is alkyl, cycloalkyl, aralkyl, aryl or heteroaryl with or without a substituent. Examples of the groups $R_5$ are the same as those exemplary of the groups $R_1$ to $R_4$ in the formula (II). Examples of the heteroaryl groups include quinoline-5-yl, quinoline-6-yl, indazole-7-yl, etc. Examples of useful sulfinic acids are ethylsulfinic acid, butylsulfinic acid, dodecanesulfinic acid, benzylsulfinic acid, benzenesulfinic acid, p-chlorobenzenesulfinic acid, p-toluenesulfinic acid, p-dodecanylbenzenesulfinic acid, p-methoxybenzenesulfinic acid, p-ethoxybenzenesulfinic acid, o-cyanobenzenesulfinic acid, p-acetaminobenzenesulfinic acid, 3-chloro-4-methylbenzensulfinic acid, 2,5-dichlorobenzenesulfinic acid, 3,4-dichlorobenzenesulfinic acid, 2,4-dimethylbenzenesulfinic acid, 3,4-dimethylbenzenesulfinic acid, 2-methyl-5-isopropylbenzenesulfinic acid, 2-methoxy-5-methylbenzenesulfinic acid, 3-nitro-4-methylbenzenesulfinic acid, 2-cyano-5-methylbenzenesulfinic acid, 2-cyano-3-methyl-5-chlorobenzenesulfinic acid, α-naphthylsulfinic acid, β-naphthylsulfinic acid, 8-nitronaphthalenesulfinic acid, 4-chloronaphthalenesulfinic acid, anthracenesulfinic acid, β-anthraquinoesulfinic acid, p-biphenylsulfinic acid, 1,2,3,4-tetrahydronaphthalenesulfinic acid, etc. Among these sulfinic acids of the formula (I), preferable are those in which the group $R_5$ is aryl, or aryl substituted with halogen, alkyl, alkoxy, substituted amino or nitro. More preferable are those in which the group $R_5$ is phenyl, naphthyl or phenyl substituted with halogen, $C_1$–$C_4$ alkyl, $C_1$ or $C_2$ alkoxy or nitro. Most preferable are those in which the group $R_5$ is phenyl substituted with $C_1$–$C_4$ alkyl.

The aqueous medium of this invention which contains a sulfinic acid is an aqueous medium in which a free sulfinic acid is present. Such an aqueous medium can be prepared by supplying to an aqueous medium a sulfinic acid of the formula (I) or a salt thereof, such as alkali metal salt, alkaline earth metal salt, ammonium salt or amine salt, and maintaining the medium preferably at a pH of up to 7, more preferably 1 to 6, most preferably 2 to 5.5.

According to the process of the invention, a hydrophobic organic solvent containing a compound of the formula (II) is dispersed and emulsified in an aqueous medium containing a sulfinic acid of the formula (I) and serving as an aqueous medium for preparing microcapsules to react the compounds of the formulae (I) and (II) and synthesize a diarylmethane derivative of the formula (III) while encapsulating oily droplets of the resulting hydrophobic organic solvent solution of the diarylmethane derivative, whereby microcapsules enclosing the diarylmethane derivative can be prepared by a single step.

With this invention, it is especially preferable that the aqueous medium have incorporated therein a hydrophilic protective colloid material. The presence of the hydrophilic protective colloid material imparts improved stability to the aqueous medium containing the sulfinic acid, greatly inhibits the side reaction to be involved in the reaction between the compound of the formula (II) and the sulfinic acid and produces the surprising effect of affording the desired diarylmethane derivative of the formula (III) within a very short period of time in good yield.

While various known hydrophilic protective colloid materials are usable in this invention insofar as they are stably soluble in aqueous media containing sulfinic acids, anionic colloid materials produce especially remarkable effects and are therefore most desirable to use.

Examples of useful anionic colloid materials are natural high-molecular-weight products such as gum arabic, pectinic acid, tragacanth gum, almond gum, sodium alginate, carrageenan, agar, etc.; semi-synthetic high-molecular-weight products such as carboxymethylated cellulose, sulfated cellulose, sulfated methyl cellulose, carboxymethylated starch, phosphated starch, etc.; and synthetic high-molecular-weight compounds such as copolymers of the maleic anhydride type (including hydrolyzed products), polymers and copolymers of the acrylic acid type, methacrylic acid type, itaconic acid type, crotonic acid type, vinylbenzene sulfonic acid type, carboxy-modified polyvinyl alcohol, phosphated polyvinyl alcohol, etc.

The foregoing effects of such hydrophilic protective colloid materials can be produced remarkably when the aqueous medium contains at least about 0.01% by weight, preferably at least about 0.1% by weight, of the colloid material. The upper limit of the amount of colloid materials is suitably determined in view of the kind of material, reaction conditions, economy, etc. It is especially preferable to use about 0.5 to about 5% by weight of the colloid material.

According to this invention, it is preferable to use the sulfinic acid of the formula (I) in an amount of at least one mole per mole of the compound of the formula (II). In view of economy, however, it is unfavorable to use more than 5 moles of the sulfinic acid. More preferably about 1 to about 3 moles, most preferably about 1 to about 1.5 moles of the sulfinic acid is used.

It is desirable that the concentration of the compound of the formula (II) in the hydrophobic organic solvent be up to about 20% by weight because higher concentrations will permit a promoted side reaction. Nevertheless, with less than about 0.2% by weight of the compound present, the resulting microcapsules will not be satisfactorily usable. Thus the concentration is preferably about 1 to about 5% by weight.

It is also desirable that the process of the invention be practiced with use of a device, such as a blender, homomixer, ball mill, sand mill, attritor or the like, to ensure the contact between the hydrophobic organic solvent and the specified aqueous medium over an increased area and to thereby effect the reaction at an increased velocity and with an improved efficiency.

The temperature of the reaction system, which should be suitably adjusted in accordance with the reaction efficiency, etc., is preferably about 10° to about 80° C. since temperatures higher than about 100° C. generally entail an accelerated side reaction and lead to reduced yields.

Insofar as the aqueous medium for preparing capsules according to the invention contains a specified sulfinic acid, the process per se for encapsulating hydrophobic oily droplets of diarylmethane derivative is not particularly limited but any known suitable encapsulating process with use of an aqueous medium is usable depending on the type of microcapsules to be obtained. Exemplary of such processes are coacervation processes as disclosed in U.S. Pat. Nos. 2,800,457 and 2,800,458, in-situ polycondensation processes as disclosed in U.S. Pat. Nos. 3,516,941 and 4,001,140, interface polycondensation processes as disclosed in British Pat. No. 950,443 and Published Examined Japanese Patent Application No. 771/1967, etc.

With the process of the invention, a compound of the formula (II) is reacted with a sulfinic acid of the formula (I) to synthesize a diarylmethane derivative of the formula (III) while encapsulating oily droplets containing the resulting derivative of the formula (III), whereby microcapsules are prepared which contain the diarylmethane derivative. The reaction between the compounds of the formulae (I) and (II) need not always be effected 100% but the degree of conversion of the compound of the formula (II) to the diarylmethane derivative of the formula (III) is controllable in accordance with the contemplated use of the resulting capsules by suitably adjusting the pH of the aqueous medium, temperature of the reaction system, reaction time, reactor, etc. Thus the oily droplets encapsulated by the process of the invention can partly be composed of the compound of the formula (II).

The process of the invention, which effects the synthesis and encapsulation of colorless chromogenic materials at the same time as described above, has the advantage that the cumbersome steps conventionally needed for the production of microcapsules can be simplified.

The hydrophilic protective colloid material incorporated in the aqueous medium serves to afford the compound of the formula (III) in improved yields and also contributes to the encapsulating process itself. For example, some anionic colloid materials, such as maleic anhydride type copolymers and carboxy-modified polyvinyl alcohol, act also as system modifiers in encapsulating processes in which urea-formaldehyde resin, melamine-formaldehyde resin or the like is used as the capsule wall-forming material (U.S. Pat. No. 4,001,140, Japanese Kokai No. 84881/1978, Japanese Patent Application No. 140805/1978, etc.). Furthermore polyvinyl alcohol and gum arabic are serviceable also as emulsifiers in encapsulating processes in which the capsule wall is prepared from an isocyanate resin (Published Examined Japanese Patent Application Nos. 771/1967 and 13508/1977, etc.). Thus these colloid materials are useful for these processes and produce improved results.

The sulfinic acid incorporated in the aqueous medium of the encapsulation system effectively prevents the compound of the formula (II) dissolved in the hydrophobic organic solvent and the diarylmethane derivative of the formula (III) from dissolving out into the aqueous medium. Consequently this prevents the substantial reduction of the amount of the colorless chromogenic material to be enclosed in the capsules and also eliminates the drawback, such as coloration of the encapsulation system, that could result from the dissolving-out of the chromogenic material into the aqueous medium.

The present invention will be described below in greater detail with reference to examples, to which, however, the invention is in no way limited. The parts and percentages in the examples are all by weight unless otherwise indicated.

EXAMPLE 1

Into a container equipped with a heater and stirrer are placed 100 g of 10% aqueous solution of ethylene-maleic anhydride copolymer (trade name "EMA-31," product of Monsanto Co., U.S.A.), 200 g of water and 3.6 g (0.014 mole) of sodium p-toluenesulfinate tetrahydrate. The pH of the mixture is adjusted to 3.0. An oily solution of 2.7 g (0.01 mole) of 4,4'-bis-dimethylaminobenzhydrol in 200 g of dibutyl phthalate is added to the mixture. The resulting mixture is treated in a homomixer to obtain an emulsion containing particles 4μ in average size. For reference, a portion of the emulsion is collected 30 minutes after the start of the treatment, and the oily component of the portion is extracted with benzene. Thin-layer chromatography of the extract reveals that the desired 4,4'-bis-dimethylamino-benzhydrol p-toluenesulfinate has been formed.

Subsequently 10 g of urea and 1 g of resorcin are dissolved in the system, and 25 g of 37% aqueous formaldehyde solution is added to the solution. With moderate stirring, the system is heated to 55° C., maintained at this temperature for 2 hours and then allowed to cool to obtain a milk-white dispersion of capsules.

EXAMPLES 2 TO 5

Five kinds of capsule dispersions are prepared exactly in the same manner as in Example 1 except that the compounds of the formula (II) and sulfinic acids listed in Table 1 are used in the same mole amounts as in Example 1.

Thin-layer chromatography conducted in the same manner as in Example 1 reveals that the desired products have been formed with high purity.

TABLE 1

| Example | Compound of formula (II) | Sulfinic acid | Product |
|---------|--------------------------|---------------|---------|
| 2 | 4,4'-bis-Diethylamino-benzhydrol | Benzenesulfinic acid | $(C_2H_5)_2N\text{-}C_6H_4\text{-}CH(SO_2C_6H_5)\text{-}C_6H_4\text{-}N(C_2H_5)_2$ |
| 3 | 4,4'-bis-Dimethylamino-benzhydrol ethyl ether | Xylenesulfinic acid | $(CH_3)_2N\text{-}C_6H_4\text{-}CH(SO_2\text{-}C_6H_3(CH_3)_2)\text{-}C_6H_4\text{-}N(CH_3)_2$ |
| 4 | 4,4'-bis-Dimethylamino-benzhydrol isopropyl ether | 2,5-Dichloro-benzenesulfinic acid | $(CH_3)_2N\text{-}C_6H_4\text{-}CH(SO_2\text{-}C_6H_3Cl_2)\text{-}C_6H_4\text{-}N(CH_3)_2$ |
| 5 | 4,4'-bis-Dimethylamino-benzhydrol methyl ether | p-Ethoxybenzene-sulfinic acid | $(CH_3)_2N\text{-}C_6H_4\text{-}CH(SO_2\text{-}C_6H_4\text{-}OC_2H_5)\text{-}C_6H_4\text{-}N(CH_3)_2$ |

EXAMPLE 6

A light blue capsule dispersion is prepared in the same manner as in Example 1 with the exception of using 0.009 mole of 3-nitro-4-methyl-benzenesulfinic acid in place of 0.014 mole of sodium p-toluenesulfinate tetrahydrate and 0.01 mole of 4,4'-bis-(N-ethyl-N-benzyl)-amino-benzhydrol in place of 0.01 mole of 4,4'-bis-dimethylamino-benzhydrol.

EXAMPLE 7

A 50 part quantity of 10% aqueous solution of the hydrolyzed product of vinyl methyl ether-maleic anhydride copolymer (trade name "Gantrez AN-169," product of GAF Corp.), 5 parts of urea, 90 parts of water and 1 part of sodium p-toluenesulfinate tetrahydrate are placed into a container equipped with a heater and stirrer and are uniformly mixed together to obtain a solution, which is then adjusted to a pH of 3.3 with 20% aqueous solution of sodium hydroxide to prepare an aqueous solution for producing capsules.

A solution of 1 part of 4,4'-bis-dimethylaminobenzhydrol in 50 parts of dibutyl phthalate is added as a capsule core material to the aqueous solution to obtain an emulsion containing particles 4μ in average size. For reference, a portion of the emulsion is collected, and the oily component thereof is extracted with benzene. Thin-layer chromatography of the extract reveals that the desired 4,4'-bis-dimethylamino-benzhydrol p-toluenesulfinate has been formed with high purity.

Subsequently 12.5 parts of 37% aqueous solution of formaldehyde is added to the emulsion, the mixture is heated at 55° C. for 1 hour with moderate stirring, and 5 parts of 10% aqueous solution of resorcin is added dropwise to the mixture. The resulting mixture is maintained at 55° C. for 2 hours and thereafter allowed to cool to obtain a capsule dispersion.

EXAMPLE 8

A 5 part quantity of anion-modified polyvinyl alcohol (trade name "Gohsenal T-350," product of Nihon Gosei Kagaku Co., Ltd., Japan), 1 part of p-toluenesulfinic acid and 140 parts of water are placed into a container equipped with a heater and stirrer and made into a uniform solution, which is then adjusted to a pH of 2.0 with 10% hydrochloric acid to obtain an aqueous medium for preparing capsules.

The same dibutyl phthalate solution as used in Example 7 is dispersed as a capsule core material in the aqueous medium to obtain an emulsion containing particles 4μ in average size.

A 50 part quantity of 37% aqueous formaldehyde solution adjusted to a pH of 8.0 with sodium hydroxide and 25 parts of urea are reacted at 70° C. for 1 hour to prepare an aqueous solution of prepolymer. A 15 part portion of the solution is added to the emulsion, the mixture is moderately stirred with heating to 60° C., and 5 parts of 10% aqueous solution of resorcin is added dropwise to the mixture. The resulting mixture is maintained at the same temperature for 3 hours and then allowed to cool to obtain a capsule dispersion.

EXAMPLE 9

A 5 part quantity of the same polyvinyl alcohol as used in Example 8, 2.5 parts of sodium p-toluenesulfinate tetrahydrate and 140 parts of water are placed into a container equipped with a heater and stirrer and made into a uniform solution, which is then adjusted to a pH of 4.0 with 10% hydrochloric acid to obtain an aqueous medium for preparing capsules.

Subsequently a solution of 2 parts of 4,4'-bis-dimethylamino-benzhydrol in 100 parts of diethyl phthalate is dispersed as a capsule core material in the aqueous medium to obtain an emulsion containing particles 6μ in average size.

Ten parts of melamine and 30 parts of 37% aqueous solution of formaldehyde adjusted to a pH of 7.0 with sodium hydroxide are reacted at 60° C. for 30 minutes, 10 parts of water and 1 part of resorcin are added to the reaction mixture, and the resulting mixture is further reacted at 60° C. for 2 minutes to obtain an aqueous solution of prepolymer of anion-modified melamine resin. The prepolymer solution and 100 parts of water are added to the emulsion, and the mixture is maintained at 60° C. for 2 hours with moderate stirring and then allowed to cool to prepare a capsule dispersion.

EXAMPLE 10

A 150 part quantity of 5% aqueous solution of acrylic acid-methyl acrylate copolymer (containing 15 mole % methyl acrylate), 0.5 part of m-methoxyphenol and 1 part of sodium p-toluenesulfinate tetrahydrate are placed into a container equipped with a heater and stirrer and made into a uniform solution, which is then adjusted to a pH of 3.0 with 20% aqueous solution of sodium hydroxide to obtain an aqueous medium for preparing capsules.

Subsequently a solution of 1.2 parts of 4,4'-bis-diethylamino-benzhydrol in 50 parts of dioctyl phthalate is dispersed as a capsule core material in the aqueous medium to obtain an emulsion containing particles 4μ in average size.

Five parts of urea and 15 parts of 37% aqueous formaldehyde solution adjusted to a pH of 8.0 with sodium hydroxide are reacted at 70° C. for 30 minutes to prepare an aqueous solution of prepolymer, which is then added to the emulsion. The mixture is maintained at 60° C. for 3 hours with moderate stirring and thereafter allowed to cool to obtain a capsule dispersion.

EXAMPLE 11

Into a container equipped with a heater and stirrer is placed 150 parts of 5% aqueous solution of partially saponified polyvinyl alcohol (trade name "PVA-217," product of Kuraray Co. Ltd., Japan). One part of sodium p-toluenesulfinate tetrahydrate is dissolved in the solution to obtain an aqueous medium for preparing capsules.

One part of 4,4'-bis-dimethylamino-benzhydrol methyl ether is dissolved in a mixture of 30 parts of alkylnaphthalene (trade name "KMC OIL," product of Kureha Chemical Ind. K.K., Japan) and 10 parts of dibutyl phthalate. Another solution is prepared by dissolving 7.5 parts of polyvalent isocyanate (trade name "Coronate L," product of Nippon Polyurethane Kogyo K.K., Japan) in 10 parts of dibutyl phthalate. These two solutions are mixed together and then dispersed as a capsule core material in the aqueous medium to obtain an emulsion containing particles 9μ in average size. During emulsification, the aqueous medium is maintained at a pH of 4 to 5 with hydrochloric acid at all times.

The emulsion is thereafter maintained at 60° C. for 3 hours and then allowed to cool to obtain a capsule dispersion.

EXAMPLE 12

Three parts of p-dodecylbenzenesulfinic acid and 200 parts of 10% aqueous solution of gum arabic are placed into a container equipped with temperature controlling means and stirrer and are heated to 60° C. to prepare an aqueous medium for producing capsules.

Three parts of 4,4'-bis-diethylamino-2,2'-dichlorobenzhydrol is dissolved in an oily mixture of 70 parts of diarylethane (trade name "SAS OIL," product of Nippon Petrochemical K.K., Japan) and 30 parts of diallyl phthalate. The solution is dispersed as a capsule core material in the aqueous medium to prepare an emulsion containing particles 5μ in average size.

Hot water (300 parts) and 200 parts of 10% aqueous solution of acid-treated gelatin heated to 60° C. are admixed with the emulsion. The mixture is adjusted to a pH of 4.3 to thereby cause coacervation.

The resulting system is cooled to 10° C. to gel the coacervate, and 2.5 parts of 50% aqueous solution of glutaraldehyde is added to the system. The resulting system is adjusted to a pH of 9 by dropwise addition of 2.5% aqueous solution of sodium hydroxide. Three hours later, the cooling is discontinued. The system is thereafter moderately stirred for 12 hours at room temperature to obtain a capsule dispersion.

PREPARATION OF PRESSURE SENSITIVE MANIFOLD PAPER

Finely divided cellulose powder (30 parts) and 250 parts of 2% aqueous solution of hydroxyethyl cellulose are added to one of the capsule dispersions prepared in Examples 1 to 12 to obtain a coating composition, which is then applied, in an amount of 4 g/m$^2$ when dried, to a paper substrate weighing 40 g/m$^2$ and thereafter dried to obtain top sheets of pressure sensitive manifold paper.

In the same manner as above, eleven kinds of top sheets are prepared with use of the other capsule dispersions.

To 250 parts of 0.2% aqueous solution of sodium alginate are added 0.2 part of sodium polyphosphate, 100 parts of acidic clay, 20 parts of finely divided calcium carbonate and 3.6 parts of potassium hydroxide to obtain a uniform mixture. A 20 part quantity (calculated as solids) of carboxy-modified styrene-butadiene copolymer latex is added to the mixture to prepare a coating composition, which is then applied, in an amount of 5 g/m$^2$ when dried, to a paper substrate weighing 40 g/m$^2$ and thereafter dried in air to obtain under sheets of pressure sensitive manifold paper.

The top sheets and the under sheets thus prepared are tested for properties by the methods described below. Table 2 shows the results.

1. Color forming ability

The top sheet is superposed on the under sheet with the coatings facing each other, and the pair of sheets is subjected to pressure of 100 kg/cm$^2$ for 30 seconds to form a color mark on the under sheet. The color density of the mark is measured in terms of reflectance (R) at 600 nm with a spectrophotometer using magnesium oxide as the standard.

2. Colorfastness of record

The top sheet is superposed on the under sheet in the same manner as above, and images are recorded on the under sheet by typewriting. The density of the record is measured in terms of reflection density (Dr) in the same manner as above. [Dr=log$_{10}$ (1/R)].

The recorded images are then treated under the conditions given below, and the density of the record is thereafter similarly measured in terms of reflection density (Dr). The colorfastness of the record is given by:

$$\frac{\text{Record density (Dr) after treatment}}{\text{Record density (Dr) before treatment}} \times 100 \, (\%)$$

| | |
|---|---|
| (1) Light resistance | exposure to room light for 5 days. |
| (2) Heat resistance | at 100° C. for 8 hours. |
| (3) Moisture resistance | at 50° C., 90% RH for 24 hours. |

The results are listed in Table 2, which indicates that the pressure sensitive manifold papers exhibit satisfactory properties which papers are made by the use of the microcapsules prepared by the process of the invention and enclosing therein the colorless chromogenic materials efficiently synthesized during the encapsulating process.

TABLE 2

| Example | Color forming ability (R × 100) | Light resistance (%) | Heat resistance (%) | Moisture resistance (%) |
|---|---|---|---|---|
| 1 | 11 | 95 | 94 | 99 |
| 2 | 16 | 92 | 91 | 94 |
| 3 | 16 | 93 | 91 | 93 |
| 3 | 16 | 93 | 91 | 93 |
| 4 | 18 | 89 | 89 | 92 |
| 5 | 17 | 89 | 90 | 92 |
| 6 | 24 | 87 | 88 | 91 |
| 7 | 14 | 95 | 93 | 99 |
| 8 | 13 | 95 | 92 | 98 |
| 9 | 8 | 96 | 95 | 99 |
| 10 | 11 | 95 | 93 | 95 |
| 11 | 13 | 93 | 91 | 95 |
| 12 | 17 | 87 | 85 | 89 |

We claim:

1. A process for preparing an aqueous medium suitable for preparing microcapsules which comprises dispersing and emulsifying a hydrophobic organic solvent containing a compound represented by the formula

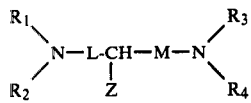  (II)

in an aqueous medium containing (1) sulfinic acid of the formula $$R_5\text{—}SO_2H$$

and (2) a hydrophilic protective colloid material to form a diarylmethane derivative represented by the formula

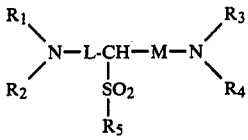  (III)

in the form of a solution of the derivative in droplets of the hydrophobic organic solvent; and wherein L and M are each a 1,4-arylene group with or without a substituent; $R_1$, $R_2$, $R_3$ and $R_4$ are each alkyl, cycloalkyl, aralkyl or aryl with or without a substituent, Z is a group represented by —O—A,

or —S—D in which A, B, C and D are each hydrogen or a hydrocarbon group with or without at least one hetero atom, and $R_5$ is alkyl, cycloalkyl, aralkyl, aryl or heteroaryl with or without a substituent.

2. A process as defined in claim 1 wherein $R_1$ to $R_4$ are each alkyl having 1 to 18 carbon atoms, cycloalkyl having 5 to 8 carbon atoms, aralkyl having 7 to 10 carbon atoms or aryl having 6 to 14 carbon atoms.

3. A process as defined in claim 2 wherein $R_1$ to $R_4$ are each said alkyl or cycloalkyl having a halogen, alkoxy, cyano or substituted amino substituent.

4. A process as defined in claim 3 wherein the halogen substituent is fluorine, chlorine, bromine or iodine, the alkoxy substituent has 1 to 4 carbon atoms, and the substituted amino substituent is

in which $R_6$ and $R_7$ have the same meaning as $R_1$ to $R_4$.

5. A process as defined in claim 2 wherein $R_1$ to $R_4$ are each said aralkyl or aryl having a halogen, alkyl, alkoxy, aralkyl, aryl, cyano, substituted amino or nitro substituent.

6. A process as defined in claim 5 wherein the halogen substituent is fluorine, chlorine, bromine or iodine, the alkyl substituent has 1 to 18 carbon atoms, the alkoxy substituent has 1 to 4 carbon atoms, the aralkyl substituent has 7 to 10 carbon atoms, the aryl substituent has 6 to 14 carbon atoms, and the substituted amino substituent is

in which $R_6$ and $R_7$ have the same meaning as $R_1$ to $R_4$.

7. A process as defined in claim 1 wherein L and M are each a 1,4-phenylene group or 1,4-naphthylene group represented by the formula

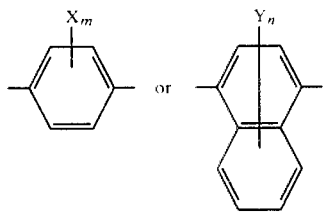

wherein X and Y are each halogen, alkyl, alkoxy, cyano, substituted amino or nitro, and m and n are each 0 or an integer of 1 or 2.

8. A process as defined in claim 7 wherein X and Y are each a halogen selected from among fluorine, chlorine, bromine and iodine, alkyl having 1 to 18 carbon atoms, alkoxy having 1 to 4 carbon atoms or substituted amino represented by

in which $R_6$ and $R_7$ have the same meaning as $R_1$ to $R_4$.

9. A process as defined in claim 1 wherein Z is OH.

10. A process as defined in claim 1 wherein the hydrocarbon group for A to D is the same as $R_1$ to $R_4$ and is alkyl, cycloalkyl, aralkyl or aryl with or without a substituent.

11. A process as defined in claim 1 wherein A to D are each hydrogen or alkyl having 1 to 3 carbon atoms.

12. A process as defined in claim 1 wherein L and M are each a 1,4-phenylene group with no substituent, and $R_1$ to $R_4$ are each alkyl having 1 to 4 carbon atoms, benzyl, or benzyl having a halogen, methyl, halogenated methyl or nitro substituent.

13. A process as defined in claim 12 wherein L and M are each a 1,4-phenylene group with no substituent, and $R_1$ to $R_4$ are each alkyl having 1 to 4 carbon atoms.

14. A process as defined in claim 1 wherein $R_5$ is aryl, or aryl having a halogen, alkyl, alkoxy, substituted amino or nitro substituent.

15. A process as defined in claim 14 wherein $R_5$ is phenyl, naphthyl or phenyl having a halogen, $C_1$–$C_4$ alkyl, $C_1$ or $C_2$ alkoxy or nitro substituent.

16. A process as defined in claim 15 wherein $R_5$ is phenyl substituted with alkyl having 1 to 4 carbon atoms.

17. A process as defined in claim 1 wherein the aqueous medium containing the sulfinic acid of the formula (I) has a pH of up to 7.

18. A process as defined in claim 17 wherein the pH is 1 to 6.

19. A process as defined in claim 18 wherein the pH is 2 to 5.5.

20. A process as defined in claim 1 wherein at least about 1 mole of the sulfinic acid of the formula (I) is used per mole of the compound represented by the formula (II).

21. A process as defined in claim 20 wherein about 1 to about 3 moles of the sulfinic acid is used per mole of the compound represented by the formula (II).

22. A process as defined in claim 21 wherein about 1 to about 1.5 moles of the sulfinic acid is used per mole of the compound represented by the formula (II).

23. A process as defined in claim 1 wherein the hydrophobic organic solvent is an aromatic mono- or poly-cyclic hydrocarbon compound or an aromatic ester.

24. A process as defined in claim 23 wherein the hydrophobic organic solvent is an aromatic ester.

25. A process as defined in claim 1 wherein the hydrophilic protective colloid material is anionic.

26. A process as defined in claim 1 wherein the concentration of the hydrophilic protective colloid material in the aqueous medium is at least about 0.01% by weight.

27. A process as defined in claim 26 wherein the concentration is at least about 0.1% by weight.

28. A process as defined in claim 27 wherein the concentration is about 0.5 to about 5% by weight.

* * * * *